May 13, 1930.  C. J. STIRDIVANT  1,758,131
SERVICE TOWER
Filed May 18, 1928
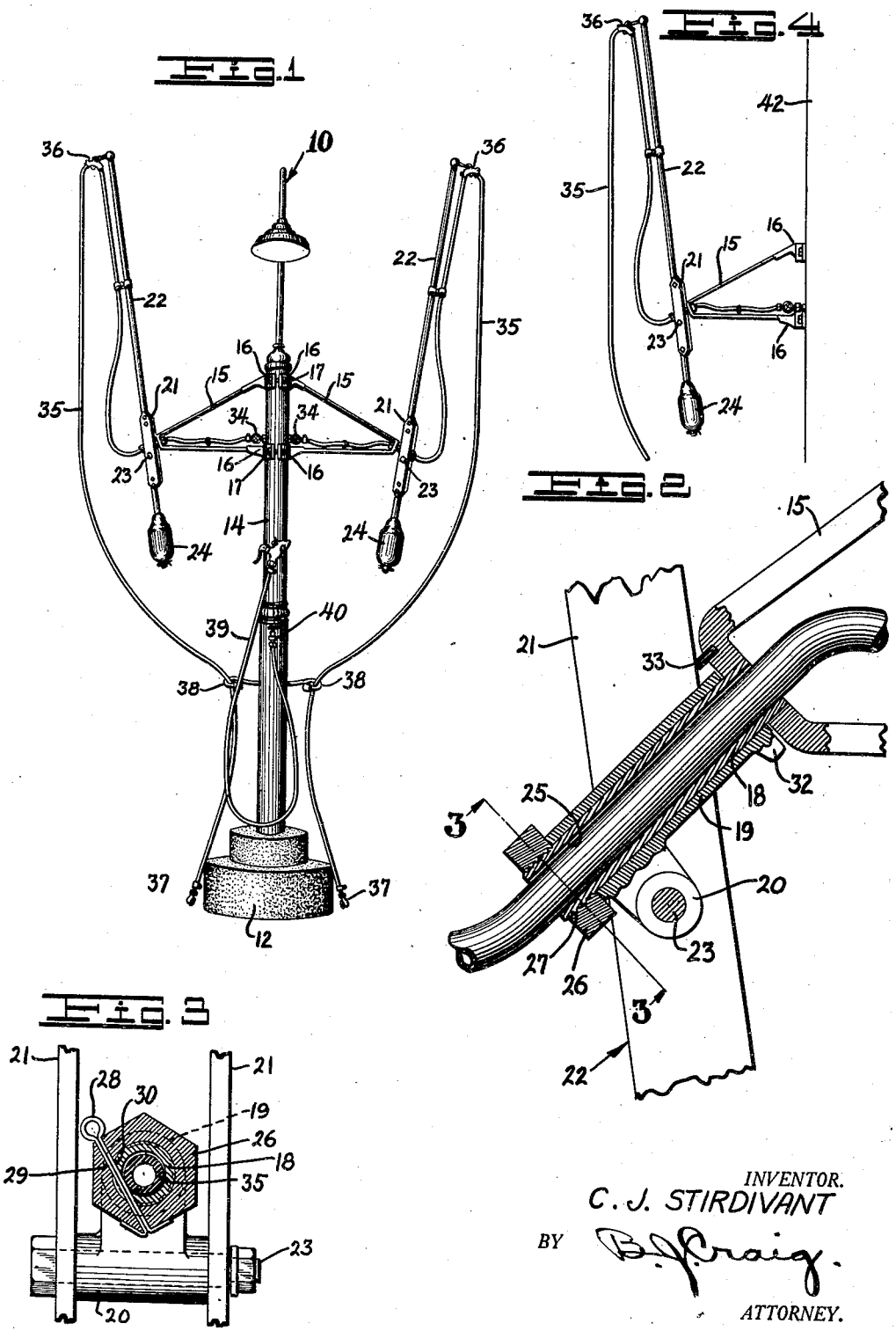
INVENTOR.
C. J. STIRDIVANT
BY B. J. Craig
ATTORNEY.

Patented May 13, 1930

1,758,131

UNITED STATES PATENT OFFICE

CLARENCE J. STIRDIVANT, OF HUNTINGTON PARK, CALIFORNIA

SERVICE TOWER

Application filed May 18, 1928. Serial No. 278,854.

This invention relates to improvements in service towers.

The general object of this invention is to provide an improved service tower for dispensing air for filling tires.

Another object of the invention is to provide an improved pivot construction for the swinging arm of an air service tower.

A further object of the invention is to provide a pivot for the swinging arm wherein the arm pivots about the axis of the air service hose.

Other objects and the advantages of this invention will be apparent from the following description taken in connection with the accompanying drawings wherein:

Fig. 1 is an elevation of my improved service tower.

Fig. 2 is an enlarged fragmentary view partly in section of one of the brackets and lever arms showing the construction of my improved pivot.

Fig. 3 is a section taken on line 3—3 of Fig. 2, and

Fig. 4 is an elevation showing a single one of the lever arms and brackets secured to a wall.

Referring to the drawings by reference characters I have indicated a service tower embodying the features of my invention generally at 10. As shown, this service tower preferably comprises a cement base 12 in which is mounted a supporting standard 14 having oppositely disposed brackets 15 secured thereto.

Each of the brackets 15 includes upper and lower members 16 which are adapted to surround the standard 14 and are secured together by bolts 17 thus firmly clamping the brackets to the standard. Each of the brackets has a trunnion 18 thereon on which is positioned a bearing 19 having a boss 20 thereon. On opposite sides of the boss I mount the side plates 21 of a lever arm 22. The side plates are pivoted to the boss as indicated at 23. Adjacent one end of the lever arm 22 I preferably provide a weighted member 24. The trunnion 18 is disposed at an angle of about 45 degrees and has a central aperture 25 therethrough.

The bearing 19 is retained in position on the trunnion by a nut 26 which engages screw threads 27 adjacent one end of the trunnion and which is adapted to be locked in position on the trunnion by a cotter pin 28. As clearly shown in Fig. 3 the cotter pin is positioned in an aperture 29 in the nut and in an aperture 30 which is provided in the trunnion to one side of the aperture 25. The passageway through the aperture 25 is thus not obstructed.

From the foregoing description it will be apparent that the lever arm 22 is adapted to swing about the trunnion 18 and that it is also adapted to swing in a transverse direction about the pivot 23. Accordingly a universal movement of the arm is obtained but there is not movement of the arm about a vertical axis. Owing to the angular disposition of the trunnion 18 the weighted member 24 will, when the lever arm has been swung to one position or another, return the lever arm to an upright position.

To prevent complete rotation of the bearing 19 around the trunnion 18 I provide a lug 32 on the bearing which is adapted to abut a stop 33 on the bracket 15.

Adjacent the brackets 15 oppositely disposed shut-off valves 34 are provided. These connect with an air supply pipe preferably located within the standard 14. To each of the valves 34 an air service hose 35 is connected. Each hose extends through an aperture 25 in a trunnion 18 and is connected as at 36 to the end portion of the associated lever arm 22 opposite the weighted member 24. The end of the hose is provided with an automatic discharge valve 37 of any desired type and hook members 38 are preferably provided on the standard 14 which are adapted to retain the hose adjacent the standard.

A water service hose 39 is also preferably provided and is attached at one end to a shut-off valve 40 which is connected to a water supply pipe preferably located in the standard 14.

Two or more of the brackets 15 may be mounted together on a single standard as shown in Fig. 1, or a single bracket may be mounted on a standard or on a wall 42 as shown in Fig. 4.

From the foregoing description it will be apparent that I have provided an improved service tower which is simple in construction and highly efficient in operation.

Having thus described my invention, I claim:

1. In a device of the class described, a support, a bracket on said support, a trunnion on said bracket, said trunnion being inclined, an aperture in said trunnion, a bearing on said trunnion and rotatable on said trunnion, means to prevent complete rotation of said bearing on said trunnion, said means comprising a lug on said bearing and a stop on said bracket.

2. In a device of the class described, a support, a bracket on said support, a trunnion on said bracket, said trunnion being inclined, an aperture in said trunnion, a bearing rotatable on said trunnion, a lever arm, said lever arm comprising two portions, one of said portions being arranged on each side of said bearing and pivoted thereto.

3. In a device of the class described, a support, a bracket on said support, a trunnion on said bracket, the axis of said trunnion being disposed at an angle between the vertical and horizontal, said trunnion having an aperture therein, a conduit passing through said aperture, a bearing on said trunnion and rotatable about said trunnion, a lever arm, said lever arm being pivoted to said bearing transversely of the axis of said bearing and a weighted member adjacent one end of said lever arm, said weighted member being adapted to normally urge said lever arm to an upright position.

4. In a device of the class described, a support, a bracket on said support, a trunnion on said bracket, said trunnion being disposed inclined, an aperture in said trunnion, a bearing rotatable on said trunnion, means to retain said bearing on said trunnion, a lever arm, said lever arm being pivoted to said bearing on an axis arranged transversely to the axis of said bearing, a weighted member adjacent one end of said lever arm, said weighted member being adapted to normally urge said lever arm to an upright position, a flexible conduit on said bracket, said conduit being positioned in said trunnion aperture and being connected to said lever arm adjacent the end opposite the weighted member.

5. In a device of the class described, a support, a bracket on said support, a trunnion on said bracket, an aperture in said trunnion, a bearing rotatable on said trunnion, a nut adapted to retain said bearing on said trunnion, said nut engaging threads on said trunnion and a pin locking said nut to said trunnion, said pin being positioned in aligned apertures in said nut and said trunnion, said last mentioned trunnion aperture extending transversely of said first trunnion aperture and being arranged at one side of said first aperture whereby when said pin is positioned in said second aperture said pin will not obstruct the passageway through said first trunnion aperture.

6. In a service tower, a support, a bracket on said support, a supporting member mounted to rotate about an inclined axis on said bracket, a shaft on said supporting member, the axis of said shaft being transverse to the axis of said member, a lever arm pivoted to said shaft, a conduit on said lever and means to supply air to said conduit.

In testimony whereof, I hereunto affix my signature.

CLARENCE J. STIRDIVANT.